P. BRAND & C. G. GLASRUD.
DUMPING VEHICLE.
APPLICATION FILED OCT. 24, 1908.
929,382.
Patented July 27, 1909.
2 SHEETS—SHEET 1.
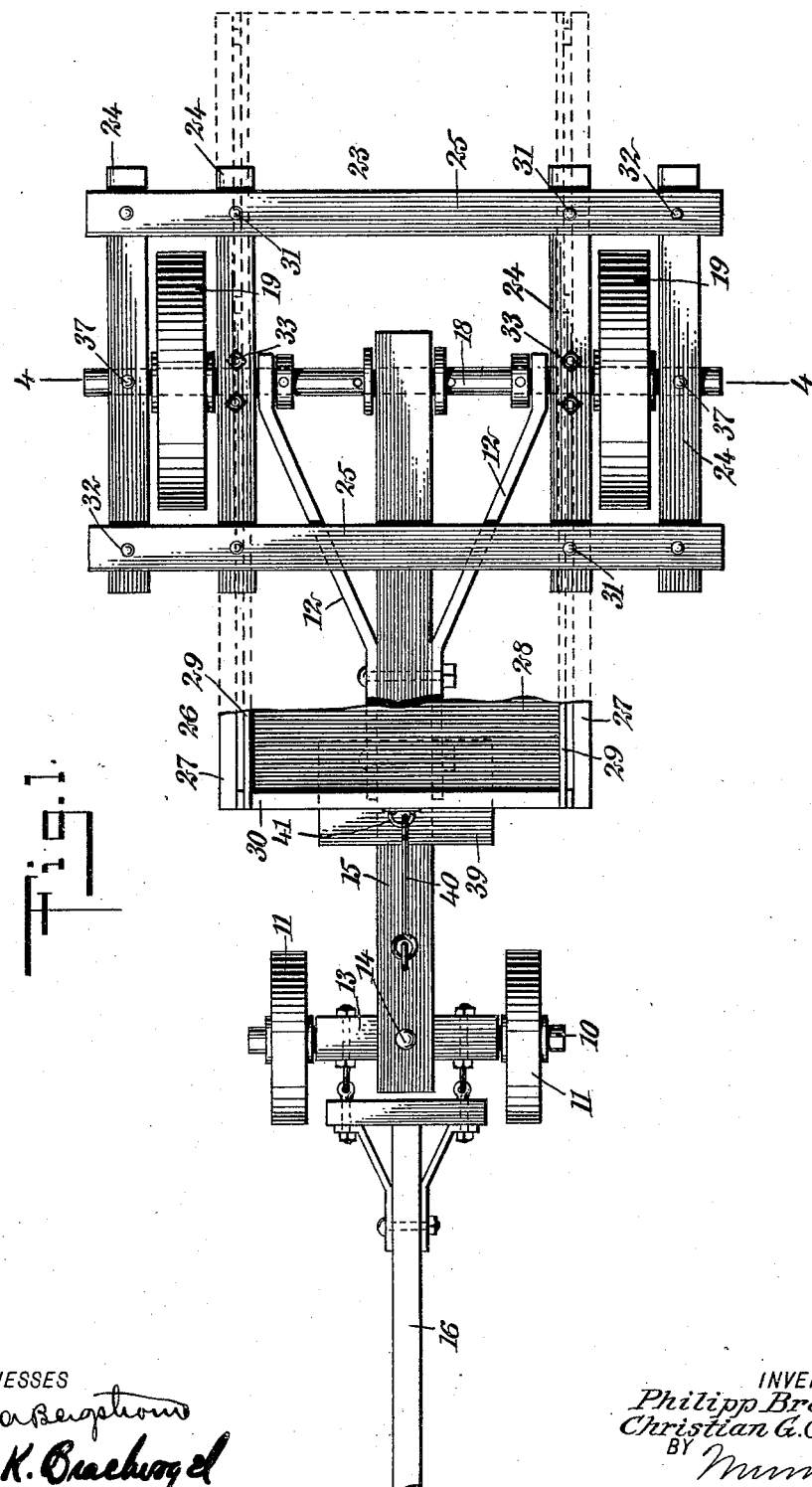
WITNESSES
Joshua Bergstrom
John K. Brachvogel
INVENTORS
Philipp Brand
Christian G. Glasrud
BY Munn & Co.
ATTORNEYS

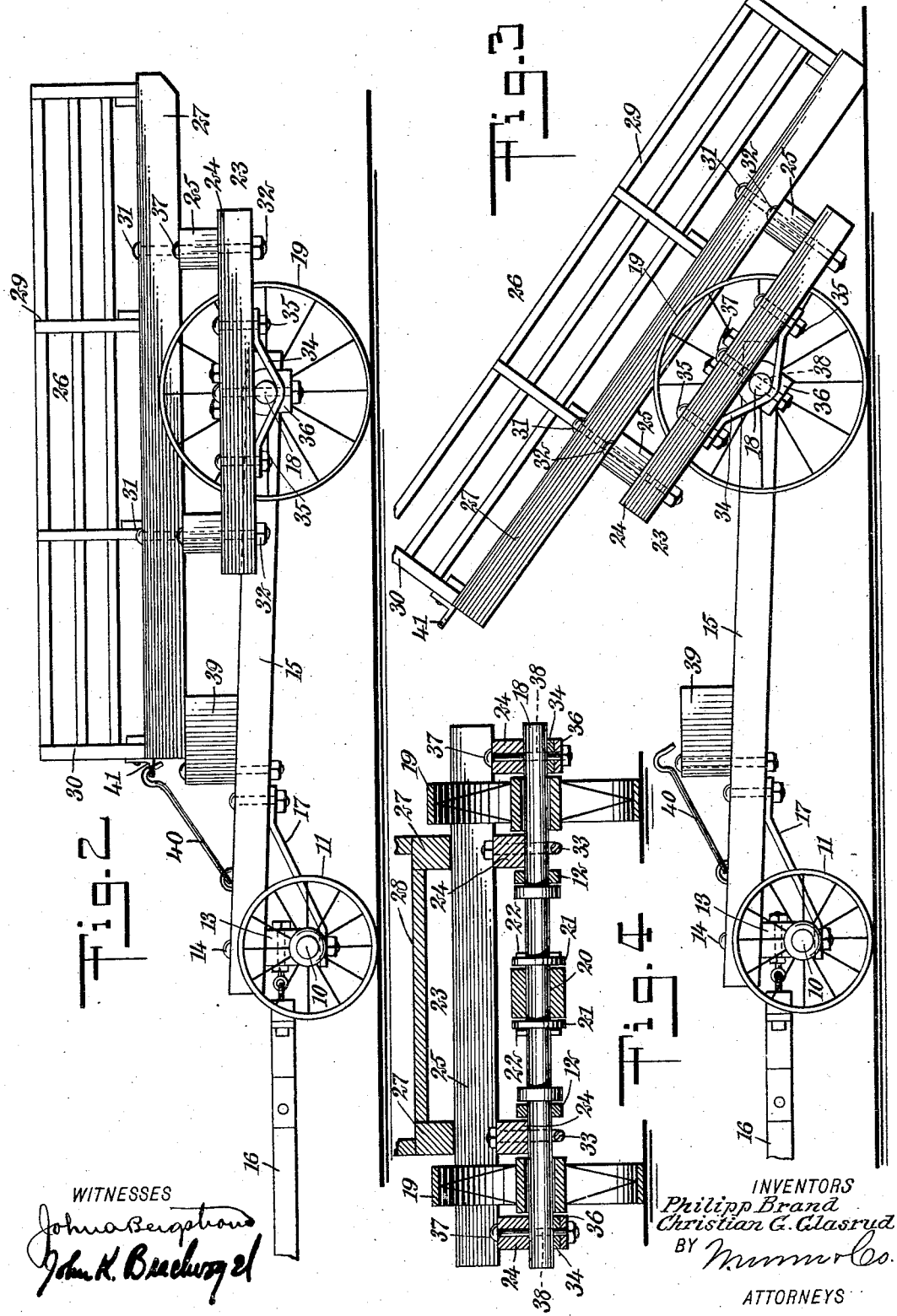

UNITED STATES PATENT OFFICE.

PHILIPP BRAND AND CHRISTIAN G. GLASRUD, OF SHEYENNE, NORTH DAKOTA.

DUMPING-VEHICLE.

No. 929,382.　　　　　Specification of Letters Patent.　　　　Patented July 27, 1909.

Application filed October 24, 1908. Serial No. 459,285.

*To all whom it may concern:*

Be it known that we, PHILIPP BRAND and CHRISTIAN G. GLASRUD, citizens of the United States, and both residents of Sheyenne, in the county of Eddy and State of North Dakota, have invented a new and Improved Dumping-Vehicle, of which the following is a full, clear, and exact description.

This invention relates to dumping vehicles, and more particularly to a vehicle of this class having a running gear of any suitable type, a frame rigidly carried by the rear axle of the vehicle, and a wagon body mounted upon the frame, the rear axle serving as a pivot to permit the body to be tilted so that its contents can be dumped.

An object of the invention is to provide a simple, strong and inexpensive dumping vehicle in which the wagon body is rigidly mounted upon the rear axle, and in which the body is so balanced that little effort is required to tilt it to dump the contents.

A further object of the invention is to provide a vehicle of the class described, in which the weight of the tilting body is mainly carried by the rear wheels, in which the rear axle is rigid with the frame supporting the body so that the axle can be turned within the hubs of the rear wheels to tilt the body of the vehicle, and in which the body can be easily returned to and held in a normal position after being dumped.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of an embodiment of our invention showing the body partly broken away; Fig. 2 is a side elevation of the vehicle; Fig. 3 is a similar view showing the body tilted; and Fig. 4 is an enlarged transverse section on the line 4—4 of Fig. 1.

Before proceeding to a more detailed explanation of our invention, it should be clearly understood that the rear axle itself, of the vehicle, supports the weight of the body and at the same time acts as a pivot which is rotatable with the body and turns within the hubs of the rear wheels to permit the body to be tilted. This construction obviates the necessity of providing special trunnions or pivots upon which the body can turn.

The vehicle is particularly useful in connection with farm work, for example in hauling shocks of grain to the threshing machine, or in transporting hay or the like from point to point. It is often a source of loss of time and labor that ordinary vehicles must be loaded and unloaded by hand. For example, in carrying shocks of grain to a threshing machine with an ordinary vehicle, it is usually necessary for the shocks to be thrown from the vehicle while the horses stand in the dust and heat and are idle. By means of our invention the shocks can be dumped at the threshing machine without even stopping the vehicle. The body is so balanced that a slight effort only, is necessary to tilt it to permit the load to slide therefrom and to escape at the open rear end which drags upon the ground. When the load has been dumped the body can be returned by depressing the forward end and this too, requires little effort. Suitable means are provided for locking the body in a normal, untilted position upon the running gear.

Referring more particularly to the drawings, we provide a front axle 10 upon which are mounted the front wheels 11 and which carries the front bolster 13. The king pin 14 movably holds the reach 15 upon the bolster. The tongue 16 is secured to the bolster in the usual manner and serves for the attachment of draft animals. It will be understood that these parts may be of any common or preferred form. A brace 17 of the usual type extends downwardly and forwardly from the reach to the under side of the front axle, being preferably provided with an opening therethrough, which receives the lower end of the king bolt to hold it in place.

The rear axle 18 upon which the rear wheels 19 are mounted, extends through a suitable opening 20 in the reach and has a collar 21 at each side of the latter to prevent the movement of the axle transversely of the reach. Pins 22 arranged in openings of the axle serve to prevent the displacement of the collars longitudinally of the axle. Braces 12 connect the reach and the rear axle. A frame 23 comprising pairs of longitudinal members 24 and thereupon cross members 25, is mounted upon the rear axle, the longitudinal members of each pair being arranged at opposite sides of one of the wheels. The cross members 25 are positioned, respectively, in front of and at the rear of the wheels 19. The wagon body 26 which consists of longitudinal side or floor beams 27, a floor 28, sides or rails 29, and a front 30, is positioned upon the cross members 25, being narrower than the frame and being arranged between the rear wheels. The beams 27, the cross members 25 and the inner longitudinal frame members 24, are secured rigidly together by means of bolts 31 or the like which are arranged in suitable openings of the parts. The cross bars 25 and the outer longitudinal frame members 24 are similarly secured together by means of bolts 32. The inner longitudinal frame members 24 are securely mounted upon the axle by means of U-bolts 33. At the under side of the outer longitudinal frame members 24 are elongated brackets 34 having V-shaped portions which engage at the under side of the axle. The ends of the brackets are firmly secured to the members 24 by means of bolts 35 or the like. Underneath the brackets are blocks or seats 36 formed to fit snugly against the brackets. Bolts 37 are arranged in transverse openings of the seats, the brackets and the outer longitudinal frame members 24 and pass through transverse openings 38 of the rear axle, to secure the frame rigidly in place upon the axle and to permit the axle to turn with the frame as the body is tilted.

The reach carries a block or support 39 formed to receive the forward end of the wagon body and to hold the same in a normal position. A hook 40 is suitably secured upon the reach and is adapted to engage an eye 41 located at the front of the wagon body to hold the same in the normal position, as is shown most clearly in Fig. 2.

It will be understood that our invention can be applied to other types of vehicles, and is not limited necessarily, to wagons or the like drawn by draft animals.

The invention does not consist in certain of the details of construction, shown for example, in the accompanying drawings, but these details can be varied without departing from the underlying spirit of the invention. Broadly, the invention consists in the provision of a running gear having an axle upon which is rigidly mounted a frame supporting the tilting vehicle body so that the axle itself can rotate in the hubs of its supporting wheels when the body tilts, means being provided for holding the body in a normal position, the body being substantially balanced upon the axle.

Having thus described our invention, we claim as new, and desire to secure by Letters Patent:

1. In a vehicle of the class described, an axle, a reach having a bearing wherein said axle is journaled whereby the latter is free to turn with respect to said reach, and a body rigid with said axle.

2. In a vehicle of the class described, a front axle having supporting wheels, a rear axle having supporting wheels, a reach secured to said front axle and having an opening movably to receive said rear axle, and a vehicle body rigid with said rear axle.

3. In a vehicle of the class described, a front axle, supporting wheels therefor, a rear axle, supporting wheels for said rear axle, a reach secured to said front axle and having an opening rotatably to receive said rear axle, a frame rigidly mounted upon said rear axle, a vehicle body rigidly carried by said frame, and means for connecting said vehicle body and said reach whereby said body can be held in a normal position.

4. In a vehicle of the class described, an axle having supporting wheels, longitudinal frame members arranged upon said axle, brackets engaging at the under side of said axle, seats adjacent to said brackets, bolts extending transversely through said seats, said brackets and said axle, cross frame members carried by said longitudinal frame members, and a vehicle body mounted upon said cross frame members.

5. In a vehicle of the class described, an axle having supporting wheels, pairs of longitudinal frame members, said members of each of said pairs being arranged at opposite sides of one of said wheels, a bolt securing one of said frame members of each of said pairs upon said axle, brackets rigidly secured to said other frame members and engaging said axle at the side remote from said frame members, seats engaging said brackets, bolts extending transversely through said seats, said brackets and said axle, cross frame members carried by said longitudinal frame members, and a vehicle body rigidly carried by said cross frame members.

6. In a vehicle of the class described, a reach having a bearing, an axle journaled in said bearing whereby it rotatably supports said reach and having wheels, a frame rigid with said axle, a vehicle body mounted upon said frame, said frame and said body being substantially balanced upon said axle, means for supporting the forward end of said body upon said reach, and means on said reach for holding said body in a normal position.

7. In a vehicle of the class described, an axle having supporting wheels, a reach supported by said axle whereby said axle is free to rotate, pairs of longitudinal frame members, said members of each of said pairs being arranged at opposite sides of one of said wheels, a U-bolt securing one of said frame members of each of said pairs upon said axle, brackets rigidly secured to said other frame members and having V-shaped parts engaging said axle at the side remote from said frame members, seats engaging said brackets, bolts extending transversely through said seats, said brackets and said axle, cross frame members carried by said longitudinal frame members, a vehicle body rigidly mounted upon said cross frame members, means on said reach for supporting said body in a normal position, and means on said reach for locking said body in a normal position.

In testimony whereof we have signed our names to this specification in the presence of two subscribing witnesses.

PHILIPP BRAND.
   CHRISTIAN G. GLASRUD.

Witnesses:
 G. SEVERTSON,
 J. H. FLUE.